US010269172B2

United States Patent
Kutz et al.

(10) Patent No.: US 10,269,172 B2
(45) Date of Patent: Apr. 23, 2019

(54) COMPUTATIONALLY EFFICIENT VOLUME RENDERING IN COMPUTER-GENERATED GRAPHICS

(71) Applicant: Disney Enterprises, Inc., Burbank, CA (US)

(72) Inventors: Peter Kutz, Los Angeles, CA (US); Ralf Habel, Toluca Lake, CA (US); Yining Karl Li, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 123 days.

(21) Appl. No.: 15/404,009

(22) Filed: Jan. 11, 2017

(65) Prior Publication Data

US 2018/0114355 A1 Apr. 26, 2018

Related U.S. Application Data

(60) Provisional application No. 62/412,182, filed on Oct. 24, 2016.

(51) Int. Cl.
*G06T 15/08* (2011.01)
(52) U.S. Cl.
CPC .................................. *G06T 15/08* (2013.01)
(58) Field of Classification Search
None
See application file for complete search history.

(56) References Cited

U.S. PATENT DOCUMENTS

| | | | | |
|---|---|---|---|---|
| 6,262,738 B1 * | 7/2001 | Gibson | ................... | G06T 15/06 345/419 |
| 7,133,041 B2 * | 11/2006 | Kaufman | ................ | G06T 15/06 345/419 |
| 7,724,258 B2 * | 5/2010 | Ebert | ...................... | G06T 13/60 345/419 |
| 8,638,331 B1 * | 1/2014 | Jarosz | .................... | G06T 15/06 345/426 |

(Continued)

OTHER PUBLICATIONS

Szirmay-Kalos, László, et al. "Free Path Sampling in High Resolution Inhomogeneous Participating Media." *Computer Graphics Forum*, vol. 30, Issue 1. Mar. 2011. pp. 85-97.

(Continued)

*Primary Examiner* — Hilina K Demeter
(74) *Attorney, Agent, or Firm* — Farjami & Farjami LLP

(57) ABSTRACT

According to one implementation, a system for rendering a volume includes a computing platform having a hardware processor, and a system memory storing a volume rendering software code. The hardware processor is configured to execute the volume rendering software code to receive data characterizing a volume to be rendered and to decompose the volume into a first volume portion and a second volume portion. The hardware processor is further configured to execute the volume rendering software code to perform a first tracking of a light ray in the first volume portion to determine a first interaction distance of the light ray in the first volume portion, perform a second tracking of the light ray in the second volume portion to determine a second interaction distance of the light ray in the second volume portion, and render the volume based on the shorter of the first and second interaction distances.

21 Claims, 5 Drawing Sheets

(56) References Cited

U.S. PATENT DOCUMENTS

| | | | | |
|---|---|---|---|---|
| 9,007,393 B2* | 4/2015 | LeFrancois | | G06T 15/503 |
| | | | | 345/419 |
| 9,092,888 B1* | 7/2015 | Gardiner | | G06T 17/00 |
| 9,189,883 B1* | 11/2015 | Hecht | | G06T 15/60 |
| 9,262,860 B2* | 2/2016 | Kulla | | G06T 15/506 |
| 9,342,920 B1* | 5/2016 | McKenzie | | G06T 15/08 |
| 9,582,926 B2* | 2/2017 | Paladini | | G06T 15/08 |
| 9,842,424 B2* | 12/2017 | Hecht | | G06T 15/08 |
| 9,916,677 B2* | 3/2018 | Novak | | G06T 15/06 |
| 9,984,510 B1* | 5/2018 | Kinstner | | G06T 19/006 |
| 2004/0001062 A1* | 1/2004 | Pharr | | G06T 15/55 |
| | | | | 345/426 |
| 2008/0150943 A1* | 6/2008 | LeFrancois | | G06T 15/503 |
| | | | | 345/426 |
| 2012/0262456 A1* | 10/2012 | Xin | | G06T 15/06 |
| | | | | 345/426 |
| 2014/0002476 A1* | 1/2014 | Tam | | G09G 5/02 |
| | | | | 345/589 |
| 2014/0204087 A1* | 7/2014 | Habel | | G06T 15/506 |
| | | | | 345/426 |
| 2014/0267275 A1* | 9/2014 | Jarosz | | G06T 15/06 |
| | | | | 345/426 |
| 2015/0363962 A1* | 12/2015 | Schmidt | | G06T 15/08 |
| | | | | 345/424 |
| 2016/0071308 A1* | 3/2016 | Nichols | | G06T 15/06 |
| | | | | 345/426 |
| 2016/0292913 A1* | 10/2016 | Wahrenberg | | G06T 15/506 |
| 2016/0381256 A1* | 12/2016 | Aguirre-Valencia | | |
| | | | | G06F 3/147 |
| | | | | 348/46 |
| 2017/0243393 A1* | 8/2017 | Nichols | | G06T 15/405 |
| 2017/0358123 A1* | 12/2017 | Novak | | G06T 15/06 |

OTHER PUBLICATIONS

Novak, Jan, et al. "Residual Ratio Tracking for Estimating Attenuation in Participating Media." *Proceedings of ACM SIGGRAPH Asia 2014*, vol. 33, Issue 6, Article 179. Nov. 2014. pp. 1-11.

Galtier, M., et al. "Integral formulation of null-collision Monte Carlo algorithms." *Journal of Quantitative Spectroscopy and Radiative Transfer*, vol. 125, Aug. 2013. pp. 57-68.

\* cited by examiner

COMPUTATIONALLY EFFICIENT VOLUME RENDERING IN COMPUTER-GENERATED GRAPHICS

RELATED APPLICATIONS

The present application claims the benefit of and priority to a Provisional Patent Application Ser. No. 62/412,182, filed Oct. 24, 2016, and titled "Tracking Methods for Volume Rendering," which is hereby incorporated fully by reference into the present application.

BACKGROUND

A participating medium is one that absorbs, scatters, or emits light and thereby "participates" in light transport into or through it. Examples of participating media include smoke, clouds, and dust, as well as marble statuary, flesh, and milk or murky water. Due to their rich organic structure, participating media are widely used in modern computer-generated graphics. For example, participating media are used to convey natural depth and scale cues and can provide meaningful shot composition.

Despite their value to computer graphics, however, incorporating participating media into light transport simulations presents a substantial computational challenge. For instance, producing an adequate representation of participating media within a conventional Monte Carlo path tracing framework can introduce prohibitive computational complexity.

SUMMARY

There are provided systems and methods for performing computationally efficient volume rendering in computer-generated graphics, substantially as shown in and/or described in connection with at least one of the figures, and as set forth more completely in the claims.

DETAILED DESCRIPTION

Figure 1:
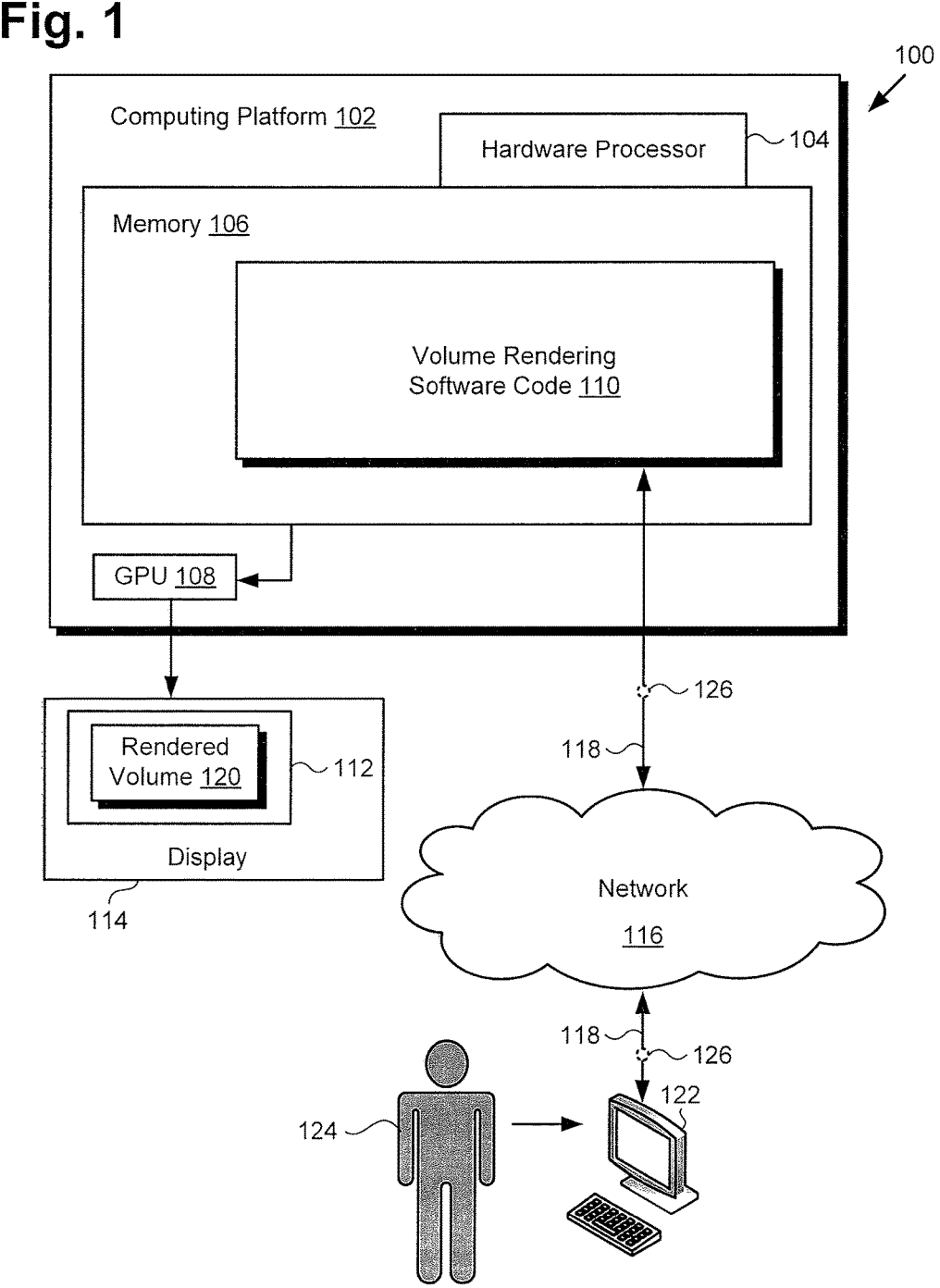
FIG. 1 shows a diagram of an exemplary system for performing computationally efficient volume rendering in computer-generated graphics, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, a participating medium is one that absorbs, scatters, or emits light and thereby "participates" in light transport into or through it. Examples of participating media include smoke, clouds, and dust, as well as marble statuary, flesh, and milk or murky water. As further stated above, due to their rich organic structure, participating media are widely used in modern computer-generated graphics, for example, to convey natural depth and scale cues and to provide meaningful shot composition. However, and as noted by Applicants, despite their value to computer graphics, incorporating participating media into light transport simulations presents a substantial computational challenge.

The present application discloses a volume rendering solution that addresses and overcomes computational challenges posed by the rendering of volumes including participating media in computer-generated graphics. By decomposing the volume to be rendered into two or more volume portions, and tracking a light ray to determine respective interaction distances in the volume portions independently, the present application discloses a modular solution for performing volume rendering. Moreover, by rendering the volume based on the shortest interaction distance in any volume portion, the present application advantageously discloses a lean computational solution having low variance.

FIG. 1 shows a diagram of one exemplary implementation of a system for performing computationally efficient volume rendering in computer-generated graphics. As shown in FIG. 1, system 100 includes computing platform 102, which has hardware processor 104, optional graphics processing unit (GPU) 108, and system memory 106 implemented as a non-transitory storage device. According to the present exemplary implementation, system memory 106 stores volume rendering software code 110. As further shown in FIG. 1, system 100 is utilized within an operating environment including communication network 116, display 114 for providing scene 112 including rendered volume 120, workstation terminal 122, and artist or user 124 utilizing workstation terminal 122. Also shown in FIG. 1 are network communication links 118 interactively connecting workstation terminal 122 and system 100 via communication network 116, and data 126 transferred from workstation terminal 122 to system 100 via network communication links 118.

It is noted that although FIG. 1 depicts volume rendering software code 110 as being stored in its entirety in memory 106, that representation is merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100. Thus, it is to be understood that volume rendering software code 110 may be stored and/or executed using the distributed memory and/or processor resources of system 100.

According to the implementation shown by FIG. 1, user 124 may utilize workstation terminal 122 to interact with system 100 over communication network 116. In one such implementation, system 100 may correspond to one or more web servers, accessible over a packet network such as the Internet, for example. Alternatively, system 100 may correspond to one or more computer servers supporting a local area network (LAN), or included in another type of limited distribution network. Moreover, in some implementations, communication network 116 may be a high-speed network suitable for high performance computing (HPC), for example a 10 GigE network or an Infiniband network.

Although workstation terminal 122 is shown as a personal computer (PC) in FIG. 1, that representation is also provided merely as an example. In other implementations, workstation terminal 122 may be any other suitable mobile or stationary computing device or system. User 124 may use workstation terminal 122 to interact with system 100, under the control of hardware processor 104 to produce scene 112 including rendered volume 120 on display 114. Display 114 may take the form of a liquid crystal display (LCD), a light-emitting diode (LED) display, an organic light-emitting diode (OLED) display, or another suitable display screen that performs a physical transformation of signals to light.

Figure 2:
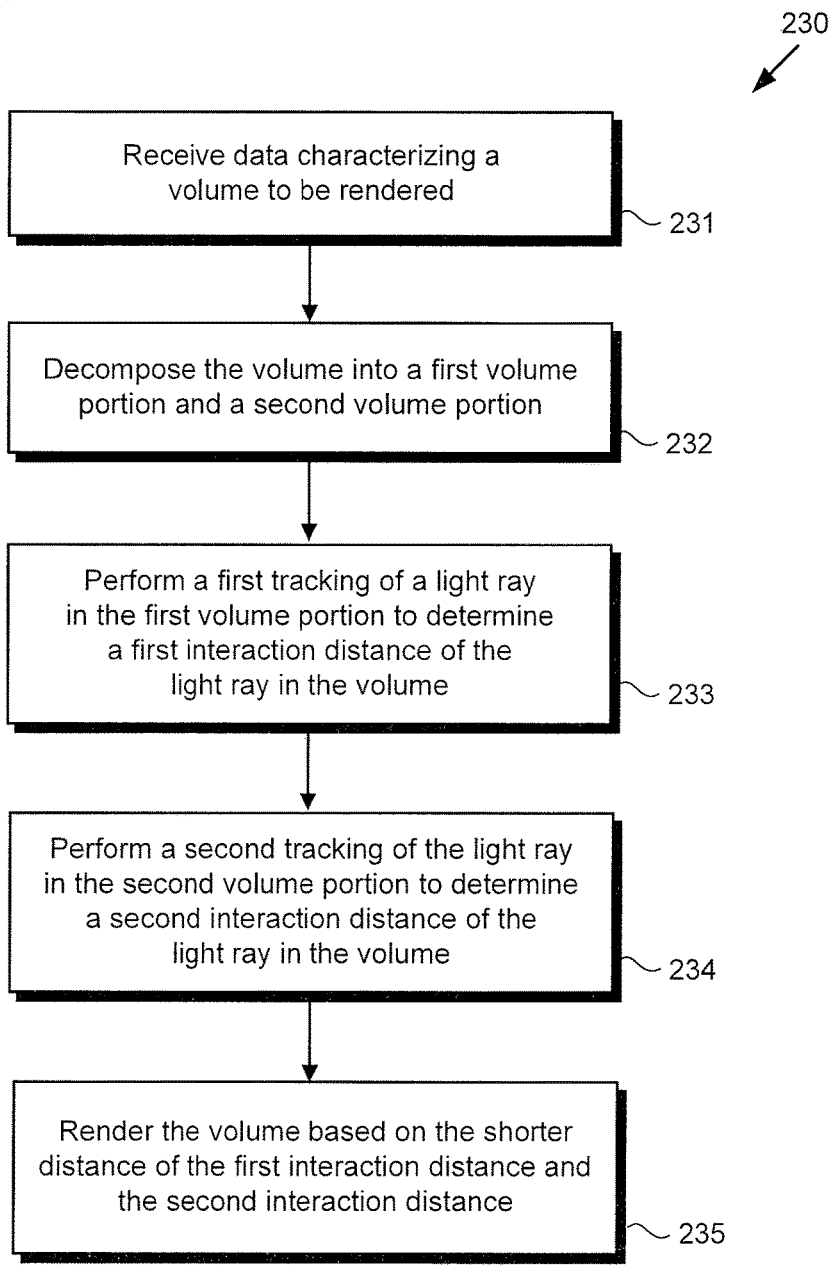
FIG. 2 shows a flowchart presenting an exemplary method for performing computationally efficient volume rendering in computer-generated graphics, according to one implementation.

The functionality of system 100 will be further described with reference to FIG. 2 in combination with FIG. 1, and FIGS. 3A, 3B, 3C, and 3D (hereinafter "FIGS. 3A-3D"), as well as with reference to FIG. 4 in combination with FIGS. 1 and 3A-3D. FIG. 2 shows flowchart 230 presenting an exemplary method for use by a system, such as system 100, in FIG. 1, to perform computationally efficient volume rendering in computer-generated graphics, while FIGS. 3A-3D show the effects of performing the actions outlined in Flowchart 230, according to one implementation. It is noted that FIG. 4 shows flowchart 490 presenting another exemplary method for use by a system corresponding to system 100, in FIG. 1, to perform computationally efficient volume rendering in computer-generated graphics.

Figure 3A:
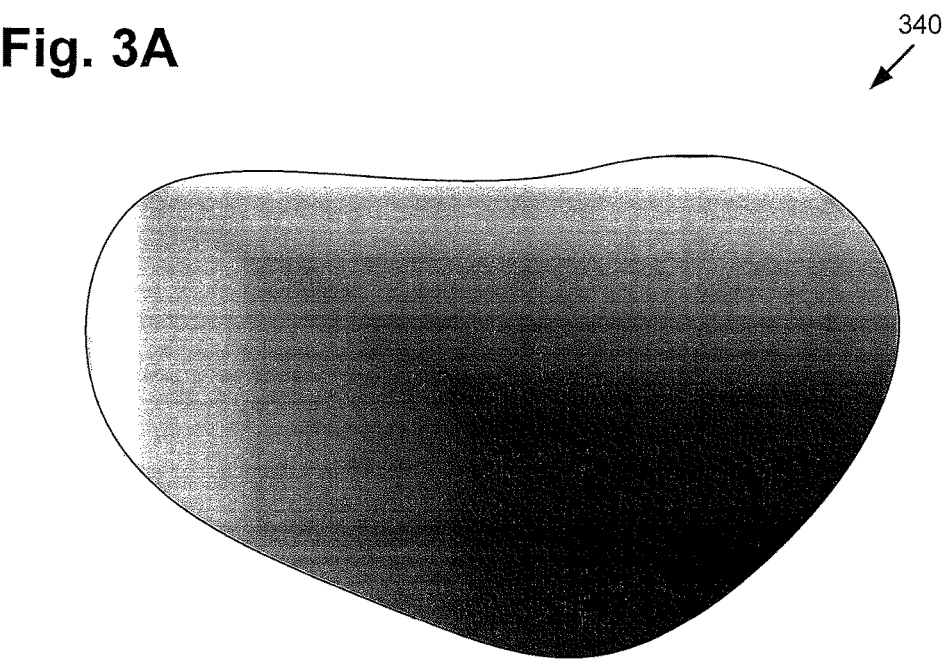
FIG. 3A shows a result of performing an initial action according to the exemplary flowchart of FIG. 2, according to one implementation.
Figure 4:
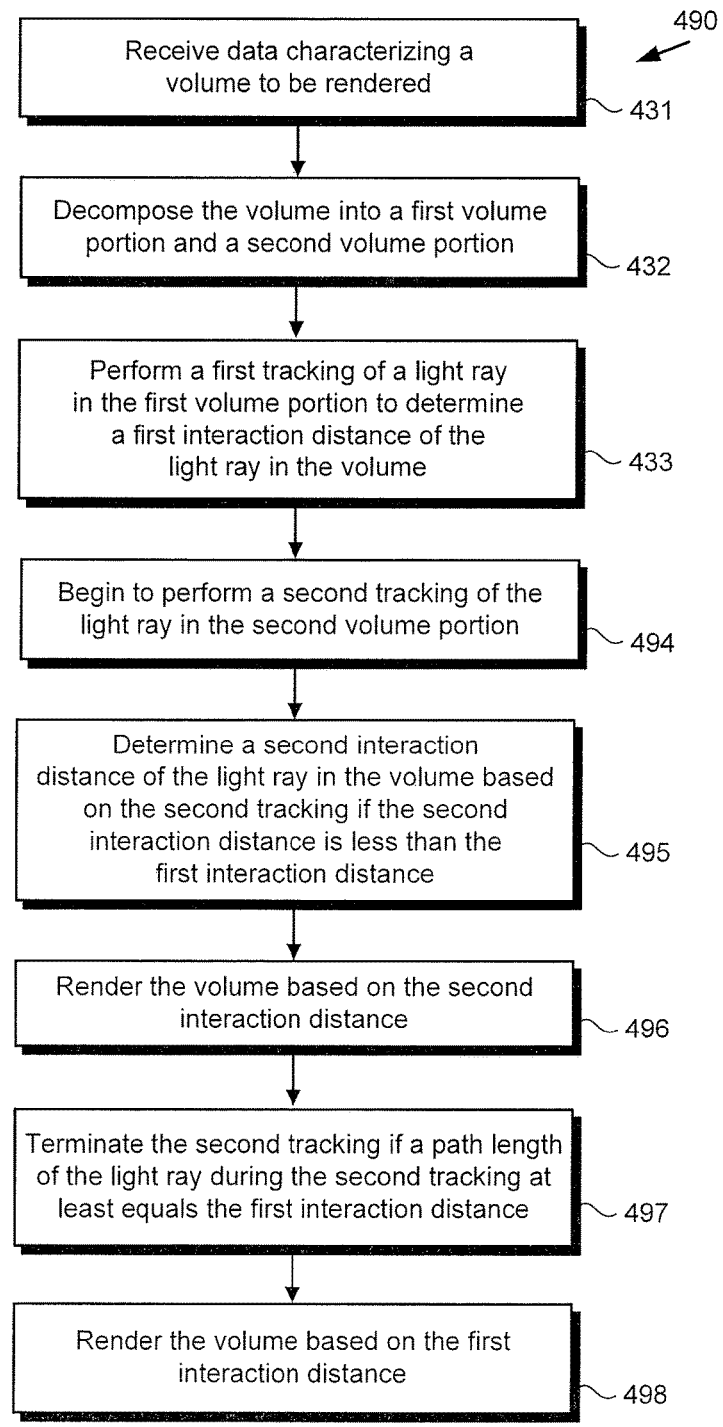
FIG. 4 shows a flowchart presenting an exemplary method for performing computationally efficient volume rendering in computer-generated graphics, according to another implementation.

Referring now to FIG. 2 in combination with FIGS. 1 and 3A, flowchart 230 begins with receiving data characterizing volume 340 to be rendered (action 231). By way of example, user 124 may utilize workstation terminal 122 to interact with volume rendering system 100 in order to generate scene 112 including rendered volume 120. As shown by FIG. 1, user 124 may do so by transmitting data 126 from workstation terminal 122 to system 100 via communication network 116 and network communication links 118. Data 126 may be data characterizing volume 340 to be rendered as rendered volume 120 of scene 112. Data 126 characterizing volume 340 may be received by volume rendering software code 110, executed by hardware processor 104.

According to the implementation shown in FIG. 3A, volume 340 to be rendered may include a participating medium. Examples of such a participating medium include translucent solid materials, such as marble, gemstones, glass, or flesh; liquids, such as milk or murky water; and gaseous media, such as dust, smoke, or clouds. Moreover, the participating medium of volume 340 may cause light passing through volume 340 to interact with the participating medium within volume 340. It is noted that, as used in the present application, an "interaction" of light with a participating medium, such as the participating medium included in volume 340, may include a scattering event, an absorption event, an extinction event, or an event including both scattering and absorption.

Figure 3B:
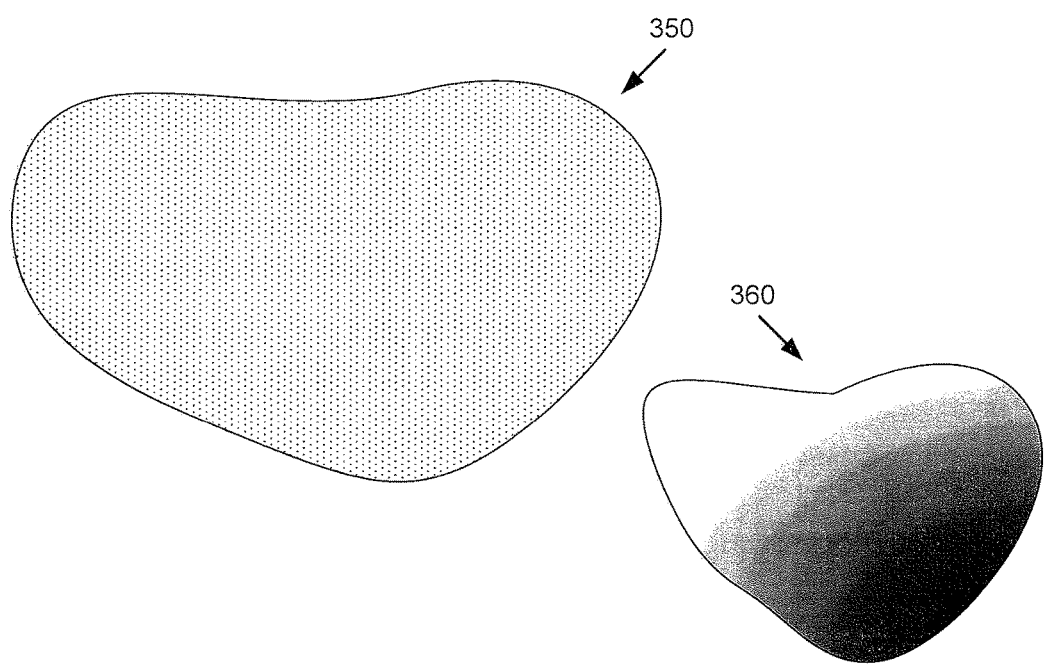
FIG. 3B shows a result of performing a subsequent action according to the exemplary flowchart of FIG. 2, according to one implementation.

Referring to FIG. 3B in combination with FIG. 2, flowchart 230 continues with decomposing volume 340 into first volume portion 350 and second volume portion 360 (action 232). Decomposition of volume 340 into first volume portion 350 and second volume portion 360 may be performed by volume rendering software code 110, executed by hardware processor 104.

Volume 340 to be rendered may be conceptualized as the superposition of at least one homogenous volume portion and a residual including at least one heterogeneous volume portion. According to the exemplary implementation shown in FIG. 3B, the present method decomposes volume 340 into two such constituent volume portions, shown as first (i.e., homogenous) volume portion 350 and second (i.e., heterogeneous) volume portion 360.

It is noted that although volume 340 is depicted as being decomposed into first and second volume portions 350 and 360, in FIG. 3B, that representation is merely by way of example. More generally, volume 340 may be decomposed into at least first and second volume portions 350 and 360, but may be decomposed into one or more additional volume portions.

It is further noted that although first volume portion 350 is shown and described as a homogenous volume portion of volume 340, while second volume portion 360 is shown and described as a heterogeneous volume portion of volume 340, those representations too are merely by way of example. In other implementations, volume 340 may be decomposed into multiple homogenous volume portions and/or multiple heterogeneous volume portions. Thus, in other implementations, first and second volume portions 350 and 360 may both be homogenous volume portions, or may both be heterogeneous volume portions of volume 340.

Figure 3C:
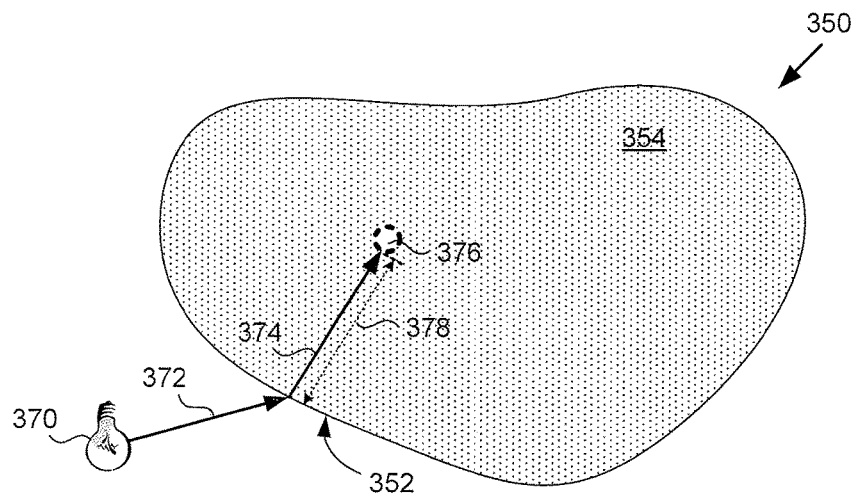
FIG. 3C shows a result of performing a subsequent action according to the exemplary flowchart of FIG. 2, according to one implementation.

Referring to FIG. 3C in combination with FIG. 2, flowchart 230 continues with performing a first tracking of light ray 372 in first volume portion 350 to determine first interaction distance 378 of light ray 372 in first volume portion 350 (action 233). The first tracking of light ray 372 in first volume portion 350 to determine first interaction distance 378 may be performed by volume rendering software code 110, executed by hardware processor 104.

As shown in FIG. 3C, light ray 372 is produced by source 370, which may be a source of light emission, as shown in FIG. 3C, or may be a camera lens, as known in the art. As further shown in FIG. 3C, light ray 372 passes through surface 352 of first volume portion 350 and enters interior region 354 of first volume portion 350. Within interior region 354, light ray 372 follows path 374 until it experiences interaction 376, i.e., a first interaction within interior region 354, at first interaction distance 378. First interaction distance 378 is the distance traveled by light ray 372 along path 374 between its transit point through surface 352 of first volume portion 350 and its first interaction 376 in first volume portion 350.

Interaction 376 and first interaction distance 378 represent the location within first volume portion 350 at which light ray 372 first interacts stochastically with interior region 354 of first volume portion 350. As noted above, interaction 376 of light ray 372 with interior region 354 of first volume portion 350 may include a scattering event, an absorption event, an extinction event, or an event including both scattering and absorption.

In implementations in which first volume portion 350 is a homogenous volume portion, as depicted in FIGS. 3B and 3C, tracking of light ray 372 in first volume portion 350 may be performed by volume rendering software code 110, executed by hardware processor 104, using a tracking technique known in the art as "regular tracking." Regular tracking may be advantageously used in cases in which a scene consists of piecewise homogeneous volumes because the transmittance of each homogeneous interval of length $d_i$ along a ray can be integrated analytically using Equation (1):

$$T(d) = \prod_{i=1}^{N} \exp(-d_i \mu_i)$$

where $T(d)$ is the transmittance and $\mu_i$ is the extinction or attenuation coefficient of the corresponding interval. The extinction coefficient, if not provided directly, can be calculated from the properties of the particles composing first volume portion 350 with $\mu = \sigma n$, where $\sigma$ is the cross section of the particles and n is their number density.

In order to obtain an interaction position on path 374 of light ray 372, per interval, an exponential importance sample can be performed (with $\zeta$ a random number in [0, 1]) using Equation 2:

$$t_i = t - \frac{\ln(1-\zeta)}{\mu_i}$$

If the sampled $t_n$ is beyond the interval boundary, then no interaction has occurred. The regular tracking approach described above is an effective technique for rendering atmospherics where large volume portions can be assumed to be homogeneous.

Figure 3D:
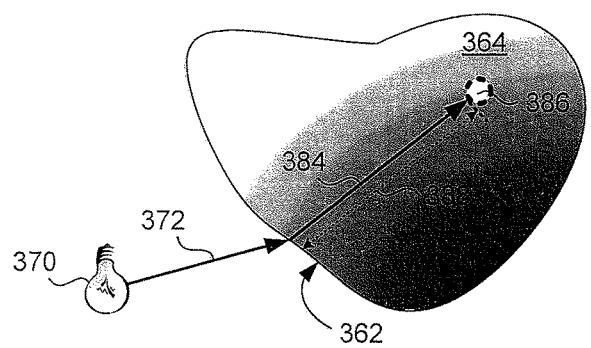
FIG. 3D shows a result of performing a subsequent action according to the exemplary flowchart of FIG. 2, according to one implementation.

Referring to FIG. 3D in combination with FIG. 2, flowchart 230 continues with performing a second tracking of light ray 372 in second volume portion 360 to determine second interaction distance 388 of light ray 372 in second volume portion 360 (action 234). The second tracking of light ray 372 in second volume portion 360 to determine second interaction distance 388 may be performed by volume rendering software code 110, executed by hardware processor 104.

As shown in FIG. 3D, light ray 372 passes through surface 362 of second volume portion 360 and enters interior region 364 of second volume portion 360. Within interior region 364, light ray 372 follows path 384 until it experiences interaction 386, i.e., a first interaction within interior region 364, at second interaction distance 388. Second interaction distance 388 is the distance traveled by light ray 372 along path 384 between its transit point through surface 362 of second volume portion 360 and its first interaction 386 in second volume portion 360.

Interaction 386 and second interaction distance 388 represent the location within second volume portion 360 at which light ray 372 first interacts stochastically with interior region 364 of second volume portion 360. Like interaction 376 of light ray 372 in first volume portion 350 discussed above, interaction 386 of light ray 372 with interior region 364 of second volume portion 360 may include a scattering event, an absorption event, an extinction event, or an event including both scattering and absorption.

In implementations in which second volume portion 360 is a homogenous volume portion, tracking of light ray 372 may be performed using regular tracking, as described above by reference to first volume portion 350. However, in implementation in which second volume portion 360 includes a heterogeneous volume portion, as depicted in FIGS. 3B and 3D, tracking of light ray 372 in second volume portion 360 may be performed by volume rendering software code 110, executed by hardware processor 104, using delta tracking.

Delta tracking estimates the scattering and resultant transmittance of the whole interval, not only up to the termination point. The distance samples generated by delta tracking are distributed according to the product of the transmittance and the extinction coefficient, which is equivalent to the negative derivative of the transmittance, as shown by Equation 3:

$$f(t) = T(t)\mu(t) = -\frac{d}{dt}T(t)$$

where $T(t)\mu(t)$ is the termination probability density function (PDF) for a particular stopping point in the interval.

The product in Equation 3 integrates to 1 and is the PDF of delta tracking, as shown by Equation 4:

$\int_0^\infty (t)\mu(t)dt = 1$

The finite case contains an unscattered contribution $p_u$ at the end of the interval. That contribution is a plain probability, and appears as a delta function in the distance PDF as shown by Equation 5:

$\int_0^d (t)\mu(t)dt + p_u = 1$

Delta tracking always delivers a weight of 1 due to perfect importance sampling of the termination PDF expressed in Equation 3 above. The termination probability allows for an early completion such that it is typically not necessary to integrate to the end of the domain.

According to the exemplary method outlined by FIG. 2, flowchart 230 can conclude with rendering volume 340 based on the shorter distance of first interaction distance 378 and second interaction distance 388 (step 235). Volume 340 may be rendered as rendered volume 120, as part of scene 112 for example, based on the shorter distance of first interaction distance 378 and second interaction distance 388. Rendering of volume 340 based on the shorter distance of first interaction distance 378 and second interaction distance 388 may be performed by volume rendering software code 110, executed by hardware processor 104.

In order to render volume 340 as a superposition of first and second volume portions 350 and 360, it is necessary to combine the first and second interaction distances 378 and 388, as well as the transmittances determined from the respective first and second trackings. Combining the transmittance estimates can be done by simply multiplying the two transmittances together.

Combining the first and second interaction distances 378 and 388 is less intuitive. In particular, Applicants have determined that first and second interaction distances 378 and 388 can be combined by taking the minimum of the two distances.

By way of illustration, it is noted that if a light ray is thought of as a photon, and a volume is thought of as a set of particles, then perfectly importance sampling an interaction distance can be interpreted as finding the distance to the first interaction of the photon with one of the volume particles. This can also be thought of as finding ray intersection distances for each of the (randomly perturbed) particles individually and then choosing the first one, and is analogous to finding the closest ray-surface intersection, but for volumes is done statistically in practice, roughly based on the limiting behavior of an infinite set of infinitesimal particles. Along the same lines, if two volumes overlap, sampling an interaction distance amounts to finding the first interaction with the union of the particles sets, which is equivalent to finding the first interaction with each set separately, and then using the closest one. Consequently, volume 340 can be rendered based on the shorter distance of first interaction distance 378 and second interaction distance 388.

Moving to FIG. 4, FIG. 4 shows flowchart 490 presenting an exemplary method for performing computationally efficient volume rendering in computer-generated graphics, according to another implementation. Referring to FIG. 4 in combination with FIGS. 1 and 3A-3D, it is noted that actions 431, 432, and 433 of flowchart 490 correspond respectively in general to actions 231, 232, and 233 of flowchart 230, described above. In other words, receiving data 126 characterizing volume 340 (action 431), decomposing volume 340 into first and second volume portions 350 and 360 (action 432), and performing a first tracking of light ray 372 in first volume portion 350 to determine first interaction distance 378 (action 433) may share any of the features described by reference to corresponding actions 231, 232, and 233 above. Moreover, actions 431, 432, and 433 of flowchart 490 may be performed by volume rendering software code 110, executed by hardware processor 104.

With respect to the remaining actions outlined in flowchart 490, it is noted that rendering of volume 340 may be performed based on the shorter distance of first interaction distance 378 in first volume portion 350 and second interaction distance 388 in second volume portion 388. In other words, because the longer of the two interaction distances is discarded, only the value of the shortest interaction distance needs to be known. That insight enables a process for "short circuiting" the rendering calculations by allowing the second tracking of light ray 372 in second volume portion 360 to terminate if and when a path length of path 384 is determined to at least equal first interaction distance 378, even if no interaction has occurred in second volume portion 360.

Thus, after action 433 is performed, flowchart 490 continues with beginning to perform a second tracking of light ray 372 in second volume portion 360 (action 494). Beginning the second tracking of light ray 372 in second volume portion 360 may be performed by volume rendering software code 110, executed by hardware processor 104.

As previously noted, in implementations in which second volume portion 360 is a homogenous volume portion, tracking of light ray 372 may be performed using regular tracking, as described above by reference to first volume portion 350 and action 233. However, in implementation in which second volume portion 360 includes a heterogeneous volume portion, as depicted in FIGS. 3B and 3D, tracking of light ray 372 in second volume portion 360 may be performed by volume rendering software code 110, executed by hardware processor 104, using delta tracking as described above by reference to action 234.

Flowchart 490 continues with determining second interaction distance 388 based on the second tracking if second interaction distance 388 is less than first interaction distance 378 (action 495). Determination of second interaction distance 388 in second volume portion 360 may be performed by volume rendering software code 110, executed by hardware processor 104.

In implementations in which volume 340 is decomposed into only two volume portions, i.e., first volume portion 350 and second volume portion 360, and in which second interaction distance 388 is determined in action 495, flowchart 490 can conclude with rendering volume 340 based on second interaction distance 388 (action 496). As noted above, rendering of volume 340 may be performed by volume rendering software code 110, executed by hardware processor 104.

However, when the length of path 384 of light ray 372 in second volume portion 360 is determined to equal or exceed first interaction distance 378 without interaction 386 having occurred, flowchart 490 can continue with terminating the second tracking (action 497). Moreover, in that case, and in implementations in which volume 340 is decomposed into only two volume portions, i.e., first volume portion 350 and second volume portion 360, flowchart 490 can conclude with rendering volume 340 based on first interaction distance 378 (action 498). Terminating the second tracking (action 497) and rendering volume 340 based on first interaction distance 378 may be performed by volume rendering software code 110, executed by hardware processor 104.

It is noted that in use cases in which volume 340 is decomposed into more than two volume portions, the methods outlined in flowcharts 230 and 490 can be readily adapted. For example, in implementations in which volume 340 is decomposed into three or more volume portions, flowchart 230 can be extended to include performing a third or other additional respective tracking(s) in the additional volume portions to determine additional respective interaction distances, and rendering of volume 340 may then be based on the shortest distance of those determined interaction distances.

In use cases in which volume 340 is decomposed into three volume portions, flowchart 490 may include disregarding first interaction distance 378 if second interaction distance 388 is determined in action 495. Where second interaction distance 388 is determined, i.e., is shorter than first interaction distance 378, flowchart 490 may further include beginning to perform a third tracking of light ray 372 in the third volume portion, and either determining a third interaction distance shorter than second interaction distance 388, or terminating the third tracking if the path length of light ray 372 in the third volume portion at least equals second interaction distance 388.

By analogy, where the second tracking is terminated at action 497, flowchart 490 may further include beginning to perform a third tracking of light ray 372 in the third volume portion, and either determining a third interaction distance shorter than first interaction distance 378, or terminating the third tracking if the path length of light ray 372 in the third volume portion at least equals first interaction distance 378. Moreover, in implementations in which volume 340 is decomposed into more than three volume portions, the method of flowchart 490 may further include at least beginning to track light ray 372 in the additional volumes, followed by determination of respective interaction distances in those additional volumes or termination of the tracking due to the path length of light ray 372 in the additional volumes. As a result, in those implementations, rendering of volume 340 may be based on the shortest of any determined interaction distance.

Thus, as explained above, the present application discloses a volume rendering solution that addresses and overcomes computational challenges posed by the rendering of volumes including participating media. By decomposing the volume to be rendered into two or more volume portions, and tracking a light ray to determine respective interaction distances in the volume portions independently, the present application discloses a modular solution for performing volume rendering. Moreover, by rendering the volume based on the shortest interaction distance in any volume portion, the present application advantageously discloses a computationally efficient solution having low variance.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a system to render a volume, the system including a hardware processor and a memory storing a volume rendering software code, the method comprising:
   receiving, by the hardware processor executing the volume rendering code, data characterizing a volume to be rendered;
   decomposing, by the hardware processor executing the volume rendering code, the volume into a first volume portion and a second volume portion;
   performing, by the hardware processor executing the volume rendering code, a first tracking of a light ray in the first volume portion to determine a first interaction distance of the light ray in the first volume portion;
   beginning to perform, by the hardware processor executing the volume rendering code, a second tracking of the light ray in the second volume portion;
   determining, by the hardware processor executing the volume rendering code, a second interaction distance of the light ray in the second volume portion based on the second tracking if the second interaction distance is less than the first interaction distance;
   terminating, by the hardware processor executing the volume rendering code, the second tracking if a path length of the light ray during the second tracking at least equals the first interaction distance; and
   rendering, by the hardware processor executing the volume rendering code, the volume based on the first interaction distance, in response to the terminating.

2. The method of claim 1, wherein decomposing the volume results in one of the first volume portion and the second volume portion being a homogenous volume portion, and the other of the first volume portion and the second volume portion comprising a heterogeneous volume portion.

3. The method of claim 2, wherein the first tracking is performed in the homogenous volume portion.

4. The method of claim 3, wherein the first tracking is performed using regular tracking.

5. The method of claim 2, wherein the second tracking is performed in the heterogeneous volume portion.

6. The method of claim 5, wherein the second tracking is performed using delta tracking.

7. The method of claim 1, further comprising:
   decomposing, by the hardware processor executing the volume rendering code, the volume into a plurality of volume portions in addition to the first volume portion and the second volume portion;
   beginning to track, by the hardware processor executing the volume rendering code, the light ray in each of the plurality of additional volume portions;
   determining, by the hardware processor executing the volume rendering code, respective interaction distances of the light ray in any of the plurality of additional volume portions in which the interaction distance is less than every previously determined interaction distance;
   terminating, by the hardware processor executing the volume rendering code, the tracking in any of the plurality of additional volume portions if a path length of the light ray at least equals any previously determined interaction distance; and
   rendering, by the hardware processor executing the volume rendering code, the volume based on the shortest determined interaction distance.

8. The method of claim 1, further comprising:
   decomposing, by the hardware processor executing the volume rendering code, the volume such that at least one of the first volume portion and the second volume portion is a homogenous volume portion;
   wherein the first tracking is performed in the at least one homogenous volume portion, and wherein the first tracking is performed using regular tracking.

9. A system comprising:
   a computing platform including a hardware processor and a system memory;
   a volume rendering software code stored in the system memory;
   the hardware processor configured to execute the volume rendering software code to:
      receive data characterizing a volume to be rendered;
      decompose the volume into a first volume portion and a second volume portion;
      perform a first tracking of a light ray in the first volume portion to determine a first interaction distance of the light ray in the first volume portion;
      begin to perform a second tracking of the light ray in the second volume portion;
      determine a second interaction distance of the light ray in the second volume portion based on the second tracking if the second interaction distance is less than the first interaction distance;
      terminate the second tracking if a path length of the light ray during the second tracking at least equals the first interaction distance; and
      render the volume based on the first interaction distance, in response to the terminating the second tracking.

10. The system of claim 9, wherein decomposing the volume results in one of the first volume portion and the second volume portion being a homogenous volume portion, and the other of the first volume portion and the second volume portion comprising a heterogeneous volume portion.

11. The system of claim 10, wherein the first tracking is performed in the homogenous volume portion.

12. The system of claim 11, wherein the first tracking is performed using regular tracking.

13. The system of claim 10, wherein the second tracking is performed in the heterogeneous volume portion.

14. The system of claim 13, wherein the second tracking is performed using delta tracking.

15. The system of claim 9, wherein the hardware processor is configured to execute the volume rendering software code to:
   decompose the volume into a plurality of volume portions in addition to the first volume portion and the second volume portion;

begin to track the light ray in each of the plurality of additional volume portions;

determine respective interaction distances of the light ray in any of the plurality of additional volume portions in which the interaction distance is less than every previously determined interaction distance;

terminate the tracking in any of the plurality of additional volume portions if a path length of the light ray at least equals any previously determined interaction distance; and render the volume based on the shortest determined interaction distance.

16. The system of claim 9, wherein the hardware processor is configured to execute the volume rendering software code to:

decompose the volume such that at least one of the first volume portion and the second volume portion is a homogenous volume portion;

wherein the first tracking is performed in the at least one homogenous volume portion, and wherein the first tracking is performed using regular tracking.

17. A system comprising:

a computing platform including a hardware processor and a system memory;

a volume rendering software code stored in the system memory;

the hardware processor configured to execute the volume rendering software code to:

receive data characterizing a volume to be rendered;

decompose the volume into a homogenous volume portion and a heterogeneous volume portion;

perform a first tracking of a light ray in the homogenous volume portion to determine a first interaction distance by measuring a distance between a first interaction point of the light ray with the volume and a second interaction point of the light ray with the homogenous volume portion;

perform a second tracking of the light ray in the heterogeneous volume portion to determine a second interaction distance by measuring a distance between the first interaction point of the light ray with the volume and a third interaction point of the light ray with the heterogeneous volume portion; and render the volume based on the shorter distance of the first interaction distance and the second interaction distance.

18. The system of claim 17, wherein the first tracking is performed using regular tracking.

19. The system of claim 17, wherein the second tracking is performed using delta tracking.

20. The system of claim 17, wherein the second interaction point is a stochastic interaction including a scattering event, or an absorption event, or an extinction event, or an event including both scattering and absorption.

21. The system of claim 17, wherein the first interaction point is at the surface of the volume.

* * * * *